United States Patent
Nagotkar

(10) Patent No.: US 11,813,835 B2
(45) Date of Patent: Nov. 14, 2023

(54) FLEXIBLE POUCH FOR ALCOHOLIC BEVERAGE

(71) Applicant: Dow Global Technologies LLC, Midland, MI (US)

(72) Inventor: Shailendra Ashok Nagotkar, Juingar (IN)

(73) Assignee: Dow Global Technologies LLC, Midland, MI (US)

(*) Notice: Subject to any disclaimer, the term of this patent is extended or adjusted under 35 U.S.C. 154(b) by 0 days.

(21) Appl. No.: 17/615,911

(22) PCT Filed: Jun. 4, 2020

(86) PCT No.: PCT/US2020/036162
§ 371 (c)(1),
(2) Date: Dec. 2, 2021

(87) PCT Pub. No.: WO2020/247658
PCT Pub. Date: Dec. 10, 2020

(65) Prior Publication Data
US 2022/0314580 A1   Oct. 6, 2022

(30) Foreign Application Priority Data
Jun. 7, 2019   (IN) .............. 201941022658

(51) Int. Cl.
*B65B 3/02* (2006.01)
*B65D 65/40* (2006.01)
(Continued)

(52) U.S. Cl.
CPC .............. *B32B 7/12* (2013.01); *B32B 15/085* (2013.01); *B32B 27/08* (2013.01); *B32B 27/32* (2013.01);
(Continued)

(58) Field of Classification Search
None
See application file for complete search history.

(56) References Cited

U.S. PATENT DOCUMENTS

| 5,677,383 A | 10/1997 | Chum et al. |
| 5,834,554 A | 11/1998 | Duan et al. |

(Continued)

FOREIGN PATENT DOCUMENTS

| CN | 203331514 U | 12/2013 |
| CN | 106520054 | * 11/2016 |

(Continued)

*Primary Examiner* — Ellen S Hock
(74) *Attorney, Agent, or Firm* — Boyle Fredrickson, S.C.

(57) ABSTRACT

The present disclosure is directed to a flexible pouch. In an embodiment, a flexible pouch is provided and includes opposing flexible laminates sealed along a common peripheral edge to form a storage compartment. Each flexible laminate has at least three layers comprising (A) a seal layer, (B) an outermost layer, and (C) an adhesive layer between the seal layer and the outer layer. The adhesive layer comprises a solvent-free polyurethane adhesive composition. An alcoholic beverage is present in the storage compartment. The flexible pouch has a solvent residue less than 1.0 mg/m², and a bond strength greater than 200 gm/15 mm after a 60-day liquor resistance test.

14 Claims, 3 Drawing Sheets

(51) Int. Cl.
*B32B 7/12* (2006.01)
*B32B 15/085* (2006.01)
*B32B 27/08* (2006.01)
*B32B 27/32* (2006.01)
*B65D 75/00* (2006.01)
*B65D 85/72* (2006.01)

(52) U.S. Cl.
CPC .......... *B65D 75/008* (2013.01); *B65D 85/72* (2013.01); *B32B 2439/70* (2013.01)

(56) References Cited

U.S. PATENT DOCUMENTS

| | | |
|---|---|---|
| 5,998,538 A | 12/1999 | Meckel et al. |
| 6,111,023 A | 8/2000 | Chum et al. |
| 6,984,695 B2 | 1/2006 | Brown et al. |
| 2011/0318552 A1 | 12/2011 | Johnson |
| 2014/0174035 A1* | 6/2014 | Murray ............ B65B 3/04 |
| | | 493/186 |
| 2018/0079170 A1 | 3/2018 | Franca et al. |
| 2018/0086527 A1 | 3/2018 | Ma et al. |
| 2018/0099493 A1* | 4/2018 | Usui ............... B65D 81/24 |
| 2018/0186130 A1 | 7/2018 | Johnson |
| 2021/0138771 A1* | 5/2021 | Bekele ............ B32B 27/32 |

FOREIGN PATENT DOCUMENTS

| | | |
|---|---|---|
| CN | 107405834 A | 11/2017 |
| CN | 108943953 A | 12/2018 |
| CN | 208915780 U | 5/2019 |

* cited by examiner

FIG. 3

| | ADCOTE™ 548-81R / Coreactant-F CS-1 | MOR_FREE™ 899A / C-99 CS-2 | 77** / 60** CS-3 | PACACEL™ 968 / C-108 IE-1 |
|---|---|---|---|---|
| * Liquor (Alcohol) Resistance (After 60 days)\ | No Blistering | Blistering | Blistering | No Blistering |

US 11,813,835 B2

FLEXIBLE POUCH FOR ALCOHOLIC BEVERAGE

BACKGROUND

Known is the flexible pouch for the packaging of non-carbonated beverage, such as fruit juice, sports drink, and the like. The flexible pouch is typically made from flexible multilayer film or from flexible laminate. For the storage of liquor, such as wine, and distilled spirits such as whiskey, vodka, and gin, for example, it is required that the laminate, and in particular the adhesive material of the laminate, be resistant to alcohol. Alcohol resistance is necessary to prevent low molecular weight compounds of the laminate and adhesive material from migrating into the liquor stored in the flexible pouch. In addition, the laminate needs to withstand the alcohol in order to maintain bond strength, and avoid surface blistering which causes physical defects in the flexible pouch.

The conventional flexible pouch is typically made from flexible laminate and solvent-based adhesive. Solvent-based adhesive provides suitable bond strength; however, solvent-based adhesive imparts solvent residue to the flexible pouch. Solvent residue is particularly problematic because of the migration hazard it imposes to the stored alcoholic beverage. Consequently, the art recognizes the need to develop pouches with flexible multilayer laminate utilizing solvent-free adhesive for the storage of alcoholic beverage. A need further exists for flexible pouch packaging of alcoholic beverages because of the higher productivity and lower production cost afforded by solvent-free adhesive systems compared to solvent-based adhesives.

SUMMARY

The present disclosure is directed to a flexible pouch. In an embodiment, a flexible pouch is provided and includes opposing flexible laminates sealed along a common peripheral edge to form a storage compartment. Each flexible laminate has at least three layers comprising (A) a seal layer, (B) an outermost layer, and (C) an adhesive layer between the seal layer and the outer layer. The adhesive layer comprises a solvent-free polyurethane adhesive composition. An alcoholic beverage is present in the storage compartment. The flexible pouch has a solvent residue less than 1.0 mg/m$^2$, and a bond strength greater than 200 gm/15 mm after a 60-day liquor resistance test.

An advantage of the present disclosure is a flexible pouch which exhibits excellent blister resistance to liquor. Namely, the present flexible pouch is blister-free after the 60-day liquor resistance test, in addition to having a solvent residue less than 1.0 mg/m$^2$, and a bond strength greater than 200 gm/15 mm after the 60-day liquor resistance test.

BRIEF DESCRIPTION OF THE DRAWINGS

FIG. 3 is a table showing the degree of blistering for various laminates after the 60-day liquor resistance test.

DEFINITIONS

Figure 1:
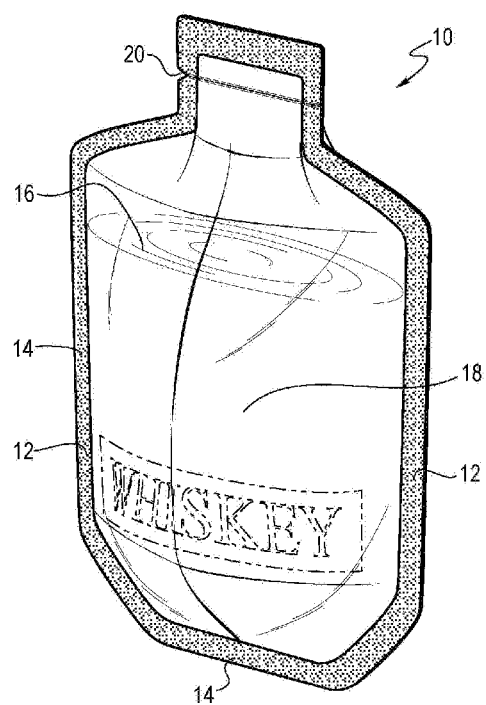
FIG. 1 is a perspective view of a flexible pouch in accordance with an embodiment of the present disclosure.

For purposes of United States patent practice, the contents of any referenced patent, patent application or publication are incorporated by reference in their entirety (or its equivalent U.S. version is so incorporated by reference), especially with respect to the disclosure of definitions (to the extent not inconsistent with any definitions specifically provided in this disclosure) and general knowledge in the art.

The numerical ranges disclosed herein include all values from, and including, the lower value and the upper value. For ranges containing explicit values (e.g., a range from 1, or 2, or 3 to 5, or 6, or 7) any subrange between any two explicit values is included (e.g., the range 1-7 above includes subranges 1 to 2; 2 to 6; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, (whether polymerized or otherwise), unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually, as well as in any combination. Use of the singular includes use of the plural and vice versa.

Unless stated to the contrary, implicit from the context, or customary in the art, all parts and percentages are based on weight and all test methods are current as of the filing date of this disclosure.

"Blend," "polymer blend" and like terms refer to a combination of two or more polymers. Such a blend may or may not be miscible. Such a combination may or may not be phase separated. Such a combination may or may not contain one or more domain configurations, as determined from transmission electron spectroscopy, light scattering, x-ray scattering, and any other method known in the art.

"Ethylene-based polymer" is a polymer that contains more than 50 weight percent polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene ("LDPE") and linear polyethylene. Nonlimiting examples of linear polyethylene include linear low density polyethylene ("LLDPE"), ultra-low density polyethylene ("ULDPE"), very low density polyethylene ("VLDPE"), multi-component ethylene-based copolymer ("EPE"), ethylene/α-olefin multi-block copolymers (also known as olefin block copolymer ("OBC")), single-site catalyzed linear low density polyethylene ("m-LLDPE"), substantially linear, or linear, plastomers/elastomers, medium density polyethylene ("MDPE"), and high density polyethylene ("HDPE"). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations. In an embodiment, the ethylene-based polymer does not contain an aromatic comonomer polymerized therein.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Ethylene plastomers/elastomers have a density from 0.870 g/cc, or 0.880 g/cc, or 0.890 g/cc to 0.900 g/cc, or 0.902 g/cc, or 0.904 g/cc, or 0.909 g/cc, or 0.910 g/cc, or 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from greater than 0.94 g/cc, or 0.945 g/cc, or 0.95 g/cc, or 0.955 g/cc to 0.96 g/cc, or 0.97 g/cc, or 0.98 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene ("HDPE") Resins, ELITE™ Enhanced Polyethylene Resins, and CONTINUUM™ Bimodal Polyethylene Resins, each available from The Dow Chemical Company; LUPOLEN™, available from LyondellBasell; and HDPE products from Borealis, Ineos, and ExxonMobil.

An "interpolymer" (or "copolymer"), is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

An "isocyanate" is a compound that contains at least one isocyanate group in its structure. An isocyanate group is represented by the formula: —N=C=O. A "polyisocyanate" is an isocyanate containing more than one, or at least two, isocyanate groups. A polyisocyanate having two isocyanate groups is a diisocyanate and an isocyanate having three isocyanate groups is a triisocyanate, etc. Isocyanates include aromatic isocyanates, aromatic polyisocyanates, aliphatic isocyanates and aliphatic polyisocyanates.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer or at least one $C_4$-$C_8$ α-olefin comonomer, or at least one $C_6$-$C_8$ α-olefin comonomer. LLDPE is characterized by little, if any, long chain branching, in contrast to conventional LDPE. LLDPE has a density from 0.910 g/cc, or 0.915 g/cc, or 0.920 g/cc, or 0.925 g/cc to 0.930 g/cc, or 0.935 g/cc, or 0.940 g/cc. Nonlimiting examples of LLDPE include TUFLIN™ linear low density polyethylene resins and DOWLEX™ polyethylene resins, each available from the Dow Chemical Company; and MARLEX™ polyethylene (available from Chevron Phillips).

"Low density polyethylene" (or "LDPE") consists of ethylene homopolymer, or ethylene/α-olefin copolymer comprising at least one $C_3$-$C_{10}$ α-olefin, preferably $C_3$-$C_4$ that has a density from 0.915 g/cc to 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Multi-component ethylene-based copolymer" (or "EPE") comprises units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer, such as described in patent references U.S. Pat. Nos. 6,111,023; 5,677,383; and 6,984,695. EPE resins have a density from 0.905 g/cc, or 0.908 g/cc, or 0.912 g/cc, or 0.920 g/cc to 0.926 g/cc, or 0.929 g/cc, or 0.940 g/cc, or 0.962 g/cc. Nonlimiting examples of EPE resins include ELITE™ enhanced polyethylene and ELITE AT™ advanced technology resins, each available from The Dow Chemical Company; SURPASS™ Polyethylene (PE) Resins, available from Nova Chemicals; and SMART™, available from SK Chemicals Co.

An "olefin-based polymer" or "polyolefin" is a polymer that contains more than 50 weight percent polymerized olefin monomer (based on total amount of polymerizable monomers), and optionally, may contain at least one comonomer. Nonlimiting examples of an olefin-based polymer include ethylene-based polymer and propylene-based polymer. An "olefin" and like terms refers to hydrocarbons consisting of hydrogen and carbon whose molecules contain a pair of carbon atoms linked together by a double bond.

A "polyester" is a compound containing two or more ester linkages in the same linear chain of atoms.

A "polyether" is a compound containing two or more ether linkages in the same linear chain of atoms.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like. In this context, the term "monomer" is understood to be referring to the polymerized remnant of the specified monomer and not to the unpolymerized species. In general, polymers herein are referred to has being based on "units" that are the polymerized form of a corresponding monomer.

A "polyol" is an organic compound containing multiple hydroxyl (—OH) groups. In other words, a polyol contains at least two hydroxyl groups. Nonlimiting examples of suitable polyols include diols (which contain two hydroxyl groups) and triols (which contain three hydroxyl groups).

A "propylene-based polymer" is a polymer that contains more than 50 mole percent polymerized propylene monomer (based on the total amount of polymerizable monomers) and, optionally, may contain at least one comonomer.

"Single-site catalyzed linear low density polyethylenes" (or "m-LLDPE") are linear ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. m-LLDPE has density from 0.913 g/cc, or 0.918 g/cc, or 0.920 g/cc to 0.925 g/cc, or 0.940 g/cc. Nonlimiting examples of m-LLDPE include EXCEED™ metallocene PE (available from ExxonMobil Chemical), LUFLEXEN™ m-LLDPE (available from LyondellBasell), and ELTEX™ PF m-LLDPE (available from Ineos Olefins & Polymers).

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. ULDPE and VLDPE each has a density from 0.885 g/cc, or 0.90 g/cc to 0.915 g/cc. Nonlimiting examples of ULDPE and VLDPE include ATTANE™ ULDPE resins and FLEXOMER™ VLDPE resins, each available from The Dow Chemical Company.

Test Methods 60-day liquor resistance test. A small pouch was made by filling the small pouch with the alcoholic beverage and then sealing the small pouch. A big pouch was made by filling with the same alcoholic beverage and inserting the small pouch inside it and then sealing the big pouch. The small pouch is in contact with the alcoholic beverage from inside and outside for 60 days. After 60 days, the small pouch was observed for appearance in terms of blisters/piping/tunneling/de-lamination. The 60-day liquor resistance test is interchangably referred to as "liquor in, liquor out."

Bond strength—Instron Material Testing machine is used for lamination bond strength testing. Turn on the machine and MERLIN icon. Ensure that the grip screws are released by pressing manually the switches just next to each gripper or by the foot padder. Using the cutter, cut the laminate sample of required dimensions (approx. 150 mm in length and width of 15 mm in this case) and delaminate it, up to length of about 20 mm. Mount it on the machine between the two grips. Assure the extension and load to be zero. Start the machine at the speed of 100 mm/min. Record the readings. Results are reported in gm/15 mm.

Density is measured in accordance with ASTM D 792 with results reported in grams (g) per cubic centimeter (cc), or g/cc.

Melt flow rate ("MFR") is measured in accordance with ASTM D 1238, Condition 280° C./2.16 kg (g/10 minutes).

Melt index (MI) is measured in accordance with ASTM D 1238, Condition 190° C./2.16 kg (g/10 minutes).

Pot life test. "Pot life" is the curing time needed for the viscosity of an adhesive composition to rise above 4500 mPa·s at 40° C., the curing time measured after the components of the adhesive composition are mixed. The components of the adhesive composition are mixed with a Flac-Tack high speed mixer at 1800 to 2000 rpm for 1 minute. The viscosity of the adhesive composition is monitored with respect to time. Viscosity is measured at 40° C. with a Brookfield Viscometer DV II having a #27 spindle spinning at, 20 rpm, #27 spindle. Pot life is reported in minutes (min).

Seal Strength. Instron Material Testing machine is used for lamination seal strength testing. Turn on the machine and MERLIN icon. Ensure that the grip screws are released by pressing manually the switches just next to each gripper or by the foot padder. Using the cutter, cut the laminate sample of required dimensions (approx. 100 mm in length and width of 15 mm in this case). Heat seal 2 strips (on Hemetek Heat Sealing machine) @ 140-150° C. for 1 sec & 2.5 bar pressure. Allow the sample to cool in order to attain room temperature. Clamp the sample in between the two jaws. Start the test and record the result. Results are reported in kg/15 mm.

Solvent residue. Residual Solvent analysis is performed through Headspace Gas Chromatography. This technique quantifies volatile solvents in a polymer matrix. A sample is placed in a closed sampling vessel. Dimethyl sulfoxide, or another suitable high boiling compound, is added to dissolve the polymer and facilitate release of volatile compounds to the gas phase. The sealed headspace vials are heated using a known temperature profile and agitated to drive volatiles from the solid or liquid phase into the gas phase. The vapour in the vessel is then analyzed.

Viscosity of an adhesive component is measured at 25° C. in accordance with ASTM D2196. Viscosity is reported in centipoise (cps).

DETAILED DESCRIPTION

The present disclosure provides a flexible pouch. In an embodiment, the flexible pouch includes opposing flexible laminates. The flexible laminates are sealed along a common peripheral edge to form a storage compartment. Each flexible laminate has at least three layers: (A) a seal layer, (B) an outermost layer, and (C) an adhesive layer between the seal layer and the outer layer. The adhesive layer is composed of a solvent-free polyurethane adhesive composition. The flexible pouch includes an alcoholic beverage in the storage compartment. Each flexible multilayer laminate has a solvent residue less than 1.0 mg/m$^2$; and a bond strength greater than 200 gm/15 mm after the 60-day liquor resistance test.

1. Flexible Laminate

The present flexible pouch includes opposing flexible laminates. In an embodiment, the flexible pouch includes two opposing flexible laminates. The two opposing laminates may be components of a single (folded) sheet/web, or may be separate and distinct laminates. The composition and structure of each flexible laminate can be the same or can be different.

In an embodiment, the two opposing flexible laminates are components of the same sheet or film, wherein the sheet is folded upon itself to form the two opposing flexible laminates. The three unconnected edges of the folded sheet can then be sealed, or heat sealed, to form the closed flexible pouch.

Each flexible laminate includes at least three, or four, or five, or six, or seven to eight, or nine, or 10, or 11, or more layers. By definition, the "flexible laminate" includes an adhesive layer having two opposing facial layers, the adhesive layer bonds a film layer along each of the facial layers.

The flexible laminate may also include one or more cast co-extruded film layers and/or one or more blown co-extruded film layers.

In an embodiment, each flexible laminate is a separate laminate having at least three layers. The flexible laminate is resilient, flexible, deformable, and pliable. The structure and composition for each of the two flexible laminates may be the same or different. For example, each of the two flexible laminates can be made from a separate web, each web having a unique structure and/or unique composition, finish, or print. Alternatively, each of the two flexible laminates can be the same structure and the same composition, or from a single web.

In an embodiment, each flexible laminate has the same structure and the same composition from a single web.

The flexible laminate may include one or more optional inner layers disposed between the seal layer and the outermost layer. In an embodiment, the flexible laminate has at least three layers (A) a seal layer, (B) an outermost layer, and (C) an adhesive layer between the seal layer and the outer layer.

The seal layer is the innermost layer of the flexible pouch. The seal layer is in direct contact with the alcoholic beverage in the storage compartment. The seal layer is composed of an olefin-based polymer. The olefin-based polymer can be a propylene-based polymer, an ethylene-based polymer, and combinations thereof.

In an embodiment, the seal layer is composed of a propylene-based polymer.

Nonlimiting examples of suitable propylene-based polymer include propylene homopolymer, propylene/α-olefin copolymer. Nonlimiting examples of suitable propylene/α-olefin copolymer include propylene/ethylene copolymer, propylene/$C_4$-$C_8$ α-olefin copolymer such as propylene/butene copolymer, propylene/hexane copolymer, and propylene/octene copolymer.

In an embodiment, the seal layer is composed of an ethylene-based polymer. Nonlimiting examples of suitable ethylene-based polymer include ethylene homopolymer, and ethylene/α-olefin copolymer. Nonlimiting examples of suitable ethylene/α-olefin copolymer include ethylene/$C_3$-$C_8$ α-olefin copolymer or ethylene/$C_4$-$C_8$ α-olefin copolymer such as ethylene/propylene copolymer, ethylene/butene copolymer, ethylene hexene copolymer, and ethylene/octene copolymer.

Other nonlimiting examples of ethylene/α-olefin copolymers for the seal layer include ethylene/$C_3$-$C_{10}$ α-olefin copolymers linear or branched; ethylene/$C_4$-$C_{10}$ α-olefin copolymers linear or branched; propylene-based polymer (including plastomer and elastomer; and random propylene copolymer); ethylene-based polymer (including plastomer and elastomer, high density polyethylene ("HDPE"); low density polyethylene ("LDPE"); linear low density polyethylene ("LLDPE"); medium density polyethylene ("MDPE"), ethylene-acrylic acid, ethylene vinyl acetate; or ethylene-methacrylic acid and their ionomers with zinc, sodium, lithium, potassium, magnesium salts, ethylene vinyl acetate copolymers; and blends thereof.

Each flexible laminate includes an outermost layer. Suitable polymeric material for the outermost layer includes those used to make biaxially or monoaxially oriented films for lamination as well as coextruded films. Nonlimiting examples of materials suitable for the outermost layer include polyethylene terephthalate ("PET"), biaxially oriented polyethylene terephthalate ("BOPET"), monoaxially oriented nylon ("MON"), biaxially oriented nylon ("BON"), and biaxially oriented polypropylene ("BOPP"), and combinations thereof. Other polymeric materials useful in constructing film layers for structural benefit are polypropylenes (such as propylene homopolymer, random propylene copolymer, propylene impact copolymer, thermoplastic polypropylene ("TPO") and the like, propylene-based plastomers (e.g., VERSIFY™ or VISTAMAX™), polyamides (such as Nylon 6, Nylon 6,6, Nylon 6,66, Nylon 6,12, Nylon 12 etc.), polyethylene norbornene, cyclic olefin copolymers, polyacrylonitrile, polyesters, copolyesters (such as PETG), cellulose esters, polyethylene and copolymers of ethylene (e.g., LLDPE based on ethylene octene copolymer such as DOWLEX™, blends thereof, and multilayer combinations thereof.

Each flexible laminate includes an adhesive layer. The adhesive layer is located between the seal layer and the outermost layer. When the flexible laminate includes one or more optional inner layers disposed between the seal layer and the outermost layer, it is understood that the flexible laminate may include two or more adhesive layers.

The adhesive layer is composed of a solvent-free polyurethane adhesive composition (or "SPAC"). The SPAC is a two-component "solvent-free adhesive composition"—i.e., an adhesive composition that is void of, or substantially void of, a solvent. The first component of the SPAC is an isocyanate component A composed of a blend of (i) an aromatic isocyanate prepolymer and/or (ii) an aliphatic isocyanate prepolymer. The second component of the SPAC is a polyol component B composed of a blend of (i) ethylene glycol, and/or (ii) a polyether polyol.

In an embodiment, component A of the SPAC has a melt viscosity from 2500 cps to 4500 cps and a density from 1.18 g/cc to 1.24 g/cc; component B is composed of a polyester polyol based on adipic acid with diethylene glycol ("DEG") and neopentyl glycol ("NPG") and has a melt viscosity from 1500 cps to 2900 cps and a density from 1.09 g/cc to 1.15 g/cc; and the SPAC has a pot life from 35 minutes to 45 minutes. The SPAC has a molecular weight of about 2000 daltons, or 2000 daltons. The SPAC is crosslinked.

In an embodiment, the adhesive layer is composed of PacAcel™ 968/C-108, a solvent-free polyurethane adhesive composition, available from Dow Inc.

The flexible laminate may include one or more optional additional inner layer(s) (or middle layers) which may contribute to the structural integrity or provide specific properties. The additional inner layer(s) may be added by extrusion or coextrusion or by using appropriate adhesive layers to the adjacent polymer layers. Polymeric materials which may provide additional performance benefits such as stiffness, toughness or opacity, as well polymers which may offer gas barrier properties or chemical resistance can be added to the laminate structure.

Nonlimiting examples of suitable materials for the inner layer(s) include PET, metalized film, metalized PET ("METPET") nylon, ethylene vinyl alcohol ("EVOH"), oriented polypropylene ("OPP"), BOPP, ethylene-based polymer, propylene-based polymer, and combinations thereof.

In an embodiment, the flexible multilayer laminate includes an inner layer (or middle layer) that is a metalized film. A "metalized film," as used herein, is a multilayer structure composed of a first layer composed of a polymeric material ("polymeric layer") and a second layer composed of a metal deposited on the polymeric layer. The metalized film is typically formed prior to the process for making the flexible laminate. The polymeric material for the metalized film may be selected from PET (or "METPET"), OPP, BOPP, polylactic acid, ethylene-based polymer, and combinations thereof. The metal layer is typically aluminum.

Any of the foregoing layers (seal, outermost, adhesive, inner layer(s)) may include additives such as stabilizers, slip additives, antiblocking additives, process aids, clarifiers, nucleators, pigments or colorants, fillers and reinforcing agents. It is particularly useful to choose additives and polymeric materials that have suitable organoleptic and or optical properties.

In an embodiment, each flexible laminate has a thickness from 50 micrometers (μm), or 60 μm, or 70 μm, or 75 μm to 80 μm, or 85, μm, or 90 μm, or 95 μm, or 100 μm, or 150 μm, or 200 μm or 300 μm. in a further embodiment, each flexible laminate has a thickness from 50 to 300 μm, or from 60 to 200 μm, or from 70 to 150 μm, or from 70 to 100 μm, or from 80 to 100 μm, or from 85 to 95 μm.

2. Flexible Pouch

The flexible pouch includes opposing flexible laminates superimposed on each other to form a common peripheral edge. The opposing flexible laminates can be two discrete laminates. Alternatively, the opposing flexible laminates can be portions of a single web wherein a first portion of the laminate is folded over a second portion of the laminate to form the common peripheral edge as previously disclosed herein. The common peripheral edge defines a shape. The shape can be a polygon (such as triangle, square, rectangle, diamond, pentagon, hexagon, heptagon, octagon, etc.), or an ellipse (such as an ovoid, an oval, or a circle).

The opposing flexible laminates are sealed together to form a hermetic seal. The seal is formed by way of an ultrasonic seal, heat seal, and combinations thereof. In an embodiment, the opposing flexible laminates are sealed by way of a heat sealing procedure. The term "heat sealing," as used herein, is the act of placing two laminates between opposing heat seal bars, the heat seal bars move toward each other, sandwiching the laminates, to apply heat and pressure to the laminates such that opposing interior surfaces (seal layers) of the laminates contact, melt, and form a heat seal, or weld, to attach the laminates to each other. Heat sealing includes suitable structure and mechanism to move the seal bars toward and away from each other in order to perform the heat sealing procedure.

The heat sealing procedure produces a peripheral seal that extends along at least a portion of the common peripheral edge. The peripheral seal forms a hermetic seal around the periphery of a flexible pouch, forming a sealed and closed flexible pouch having a storage compartment. A liquid is present in the storage compartment. Nonlimiting examples of suitable liquids include fluid comestibles (beverages, condiments, salad dressings, flowable food), liquid or fluid medicaments, aqueous plant nutrition, household and industrial cleaning fluids, disinfectants, moisturizers, lubricants, surface treatment fluids such as wax emulsions, polishers, floor and wood finishes, personal care liquids (oils, creams, lotions, gels) etc.

In an embodiment, the liquid in the storage compartment is an alcoholic beverage. The alcoholic beverage in the storage compartment is in direct contact with the seal layer. An "alcoholic beverage," as used herein, is a comestible liquid containing from 1.0% ethanol by volume to 95% ethanol by volume. Nonlimiting examples of suitable alcoholic beverages include absinthe, amaretto, beer, brandy, bourbon, cider, cognac, grappa, gin, ouzo, rum, sake, schnaps, scotch, soju, tequila, whiskey, wine, vermouth, vodka, and combinations thereof. The flexible container with the alcoholic beverage in the storage compartment has a solvent residue less than 1.0 mg/m$^2$; and a bond strength greater than 200 gm/15 mm after the 60-day liquor resistance test.

In an embodiment, a flexible pouch 10 is provided as shown in FIG. 1. Flexible pouch 10 includes opposing flexible laminates superimposed on each other and form a common peripheral edge 12. Each flexible laminate is a three-layer structure and includes (A) a seal layer composed of an ethylene-based polymer, (B) an outermost layer composed of a PET, and (C) a SPAC layer between the seal layer and the outermost layer. The SPAC layer (C) bonds the seal layer (A) directly to the outermost layer (B). A peripheral seal 14 extends along the common peripheral edge to form a storage compartment 16. An alcoholic beverage 18 is located in the storage compartment 16. The flexible pouch 10 with the alcoholic beverage 18 in the storage compartment 16 has a solvent residue of less than or equal to 0.05 mg/m$^2$ and a bond strength greater than 200 gm/15 mm after the 60-day liquor resistance test for a 3 layer laminate. In a further embodiment, flexible pouch 10 has a solvent residue from greater than 0 to 0.05 mg/m$^2$, and a bond strength from 210 to 300 gm/15 mm, or from 250 to 290 gm/15 mm.

In an embodiment, flexible pouch 10 includes a release member 20. Release member 20 is a detachable portion of flexible pouch 10. Release member 20 can be completely (or wholly) detached from flexible pouch 10. Alternatively, release member 20 can be partially detached, with a portion of release member 20 remaining attached to flexible pouch 10. The purpose of the release member is two-fold. First, release member 20 blocks, or otherwise prevents, the flow of the alcoholic beverage from the storage compartment during storage of flexible pouch 10. Second, detachment, or removal, of release member 20 from flexible pouch 10 enables dispensing of the alcoholic beverage from flexible pouch 10.

Figure 2:
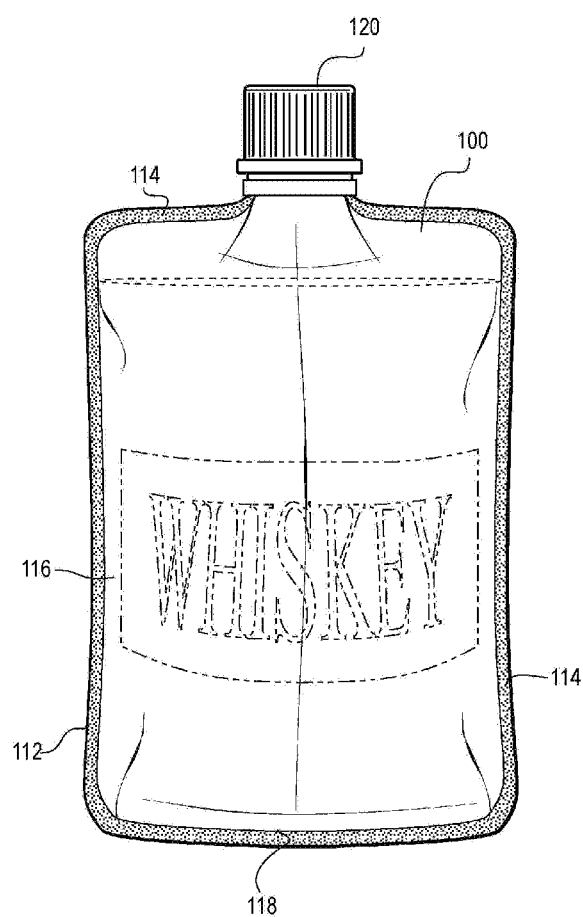
FIG. 2 is a perspective view of a flexible pouch in accordance with an embodiment of the present disclosure.

In an embodiment, a flexible pouch 100 is provided as shown in FIG. 2. Flexible pouch 100 includes opposing flexible laminates superimposed on each other and form a common peripheral edge 112. Each flexible laminate is a five layer structure and includes (A) a seal layer composed of an ethylene-based polymer, (B) an outermost layer composed of a PET, (C) an inner layer composed of metalized PET, and (D) two SPAC layers, one SPAC layer between the seal layer and the metalized PET layer and a second SPAC layer between the metalized PET layer and the outermost layer. A peripheral seal 114 extends along the common peripheral edge to form a storage compartment 116. An alcoholic beverage is located in the storage compartment 116. The flexible pouch 100 with the alcoholic beverage in the storage compartment 116 has a solvent residue of less than 0.20 mg/m$^2$ and a bond strength greater than 200 gm/15 mm after the 60-day liquor resistance test. In a further embodiment, flexible pouch 100 has a solvent residue from greater than 0 to 0.15 mg/m$^2$ and a bond strength from 250 to 275 gm/15 mm after the 60-day liquor resistance test.

In an embodiment, flexible pouch 100 includes a gusset panel 118. Gusset panel 118 is made from the opposing flexible laminates. The gusset panel joins the first flexible laminate to the second flexible laminate along a bottom of the storage compartment to form a base for flexible pouch 100. Gusset panel 118 is formed by sealing (and optionally folding) a portion of the first laminate with a portion of the second flexible laminate, such as during a form, fill, and seal operation, for example. Nonlimiting procedures for joining the gusset panel to the opposing flexible laminates include heat seal, ultrasonic seal, impulse, RF sealing, weld, adhesive seal, and combinations thereof. The opposing flexible laminates and gusset panel form storage compartment 116.

Gusset panel 118 provides flexible pouch 100 with a base having (1) the structural integrity to support flexible pouch 100 and the alcoholic beverage in the storage compartment without leakage, and (2) provides flexible pouch 100 the stability to stand vertically upright without tipping over. The gusset panel contacts a horizontal surface, or a substantially horizontal surface, and holds or otherwise maintains flexible pouch 100 in an upright position, or in a substantially upright position. In this sense, flexible pouch 100 is a "vertical stand-up flexible container," or a "vertical stand-up pouch," or a "stand-up pouch."

In an embodiment, flexible pouch 100 includes a spout 120 for dispensing the alcoholic beverage. The spout 120 may include a closure that is openable and reclosable by way of a threaded engagement between the exterior surface of the spout and the interior surface of the closure. FIG. 2 shows a reclosable closure (not numbered) on the spout 120.

By way of example, and not limitation, examples of the present disclosure are provided.

Examples

1. Flexible Pouch with Flexible Three-Layer Laminates

Flexible three-layer laminates are prepared having the following structure: outermost layer/adhesive layer/seal layer (innermost layer). The outermost layer is polyethylene terephthalate ("PET"), having a thickness of 12 microns. The seal layer is white opaque polyethylene film, having a thickness of 65 microns. Four different adhesive compositions are evaluated for the adhesive layer. The adhesive layer has a thickness of 2.7 gsm (with Adcote™ 548-81R/Coreactant-F) and 1.8 gsm-1.9 gsm (with Mor-Free™ 899A/C-99, 77/60 adhesive, and PacAcel™ 968/C-108).

The compositions for each of the layers are provided in Table 1 below.

TABLE 1

Materials for flexible laminate

| No. | Sample Type | Product Name/Composition | Source |
|---|---|---|---|
| | PET | Outermost layer: J-201 PET film with 12 micron thickness | Jindal Poly Films Limited |
| | PE | Seal layer LLDPE, ethylene/octene copolymer ELITE 5401 with 65 micron thickness | Dow Inc. |
| | | Adhesive compositions for adhesive layer | |
| 1 | CS-1 | ADCOTE ™ 548-81R/COREACTANT-F Solvent-based polyurethane adhesive composition Polyester Polyol based on adipic acid with diethylene glycol (DEG) and neopentyl glycol (NPG), Mw greater than 5000, crosslinked | Dow Inc. |
| 2 | CS-2 | Mor-Free ™ 899A/C-99 Solvent-free polyurethane adhesive composition Polyester polyol based on adipic acid with DEG | Dow Inc. |
| 3 | CS-3 | 77**/60** polyurethane adhesive composition Solvent-free polyurethane adhesive composition Polyester polyol based on adipic acid with DEG and monopropylene glycol (MPG) | N/A |
| 4 | IE-1 | PacAcel ™ 968/C-108 Solvent-free polyurethane adhesive composition Polyester Polyol based on adipic acid with DEG and NPG, Mw ~2000, crosslinked | Dow Inc. |

CS = Competitive sample
IE = Inventive example

The PET film is laminated to the PE film using a lamination machine. Solvent-based adhesive CS-1 is applied to one substrate (PET Film) and dried in the heating chamber. It is then in the dry solid or slightly tacky stage and joined with the other substrate (PE Film). The bonding is achieved during a high temperature, high pressure nip. The temperature and pressure are sufficient to cause the adhesive to flow and create an instantaneous bond when it cools and gels.

In solvent-free adhesive system (CS-2, CS-3, IE-1), the two-part polyurethane laminating adhesives require a mixing and metering unit. The mixed adhesive is coated onto a substrate (PET Film) and joined with the seal layer film (PE Film) through heated nipping roller.

A separate laminate is made using each of the adhesive compositions presented in Table 1 above. Lamination process parameters are provided in Table 2 below.

TABLE 2

Lamination process parameters for 3 layer laminate

|  | ADCOTE ™ 548-81R/ Coreactant-F CS-1 | MOR-FREE ™ 899A/C-99 CS-2 | 77**/60** CS-3 | PACACEL ™ 968/C-108 IE-1 |
|---|---|---|---|---|
| Mixing ratio | 100:11:136 | Set = 100:50 Actual = 100:49.4 | Set = 100:80 Actual = 100:79.2 | Set = 100:45 Actual = 100:45.5 |
| Solvent used for dilution | Ethyl Acetate | N.A. | N.A. | N.A. |
| Viscosity (sec) by FC B4 @ 25° C. | 19 sec | N.A. | N.A. | N.A. |
| Adhesive gsm | 2.7 | 1.8 | 1.9 | 1.9 |
| NCO Tank Temp. | N.A. | 40° C. | 44° C. | 42° C. |
| OH Tank Temp. | N.A. | 35° C. | 38° C. | 38° C. |
| Hose Temp. | N.A. | 40° C. | 40° C. | 40° C. |
| Metering Roller (S1/S2) Temp. | N.A. | 40° C. | 40° C. | 42° C. |
| Coating Roller (S3) Temp. | N.A. | 46° C. | 45° C. | 45° C. |
| Nip Roller (S4) Temp. | N.A. | 40° C. | 40° C. | 40° C. |

N.A. = not applicable

The laminates formed under the conditions of Table 2 are formed into flexible pouches. The laminates are heat sealed using a Hemetek Heat Sealing machine at seal conditions of 150° C., 1.0 second dwell time, and 2.5 bar pressure.

The flexible pouches are evaluated for bond strength (before and after the 60-day liquor resistance test), seal strength, and solvent residue. The bond strength between the adhesive layer and the PET layer is measured (1) before filling the pouch with an alcoholic beverage and (2) 60 days after the flexible pouch is filled with an alcoholic beverage and is recorded in Table 3 below. The average of three runs is provided in Table 3 below.

TABLE 3

Flexible pouches, 3-layer laminates

|  | ADCOTE ™ 548-81R/ Coreactant-F CS-1 | MOR-FREE ™ 899A/C-99 CS-2 | 77**/60** CS-3 | PACACEL ™ 968/C-108 IE-1 |
|---|---|---|---|---|
| Bond Strength (Before 60-day Liquor Resistance Test) (gm/15 mm) | 441 PET tear | 407 PET tear | 405 PET tear | 444 PET tear |
| Bond Strength (After 60-day Liquor Resistance Test) (gm/15 mm) | 282 PET tear | 180 PET tear | 178 PET tear | 285 PET tear |
| Seal Strength (Kg/15 mm) 150° C., 1.0 sec, 2.5 bar pressure | 4.4 Laminate elongate & break at seal | 4.1 Laminate elongate & break at seal | 4.2 Laminate elongate & break at seal | 4.3 Laminate elongate & break at seal |
| Solvent Residue (mg/m$^2$) | | | | |
| EA | 2.71 | 0.09 | 0.07 | 0.05 |
| MEK | 0.86 | 0.04 | 0.02 | Not Detected |
| Total | 3.57 | 0.13 | 0.09 | 0.05 |
| Alcohol Resistance (3 layer laminate) | Good | Bad | Bad | Good |
| Blister Resistance (3 layer laminate) | No Blister formation | Blister formation observed | Blister formation observed | No Blister formation |
| Package Defects beyond 60 days (3 layer laminate) | No De-lamination | Delamination observed | Delamination observed | No De-lamination |

EA = Ethyl Acetate
MEK = Methyl Ethyl Ketone

FIG. 3 provides photographs showing the degree of blistering for each laminate after the 60-day liquor resistance test.

2. Flexible Pouch with Flexible Five-Layer Laminates

Five-layer laminates are prepared having the following structure: outermost layer/adhesive layer/middle layer/adhesive layer/seal layer (innermost layer). The outermost layer is polyethylene terephthalate ("PET"), having a thickness of 12 microns. The seal layer is polyethylene film (ELITE 5401) having a thickness of 75 microns. Each adhesive layer has a thickness of 1.5-1.6 gsm (PET/METPET) and 1.3-1.4 gsm (METPET/PE). The five layer laminate structure is abbreviated as PET/adh/METPET/adh/PE. The four different adhesive compositions from Table 1 are evaluated for the adhesive layer.

The compositions for each of the adhesive layers are provided in Table 1.

Lamination is performed with five adhesive compositions using the conditions in Table 4 below.

TABLE 4

Lamination process parameters for 5-layer laminate

| Adhesive | ADCOTE ™ 548-81R/ Coreactant-F CS-1 | MOR-FREE ™ 899A/C-99 CS-2 | 77**/60** CS-3 | PACACEL ™ 968/C-108 IE-1 |
|---|---|---|---|---|
| Mixing ratio | 100:10:150 | Set = 100:50 Actual = 100:50.6 | Set = 100:80 Actual = 100:79.8 | Set = 100:45 Actual = 100:46.2 |
| Solvent used for dilution | Ethyl Acetate | N.A. | N.A. | N.A. |
| Viscosity (sec) by FC B4 @ 25° C. | 18 sec | N.A. | N.A. | N.A. |
| Adhesive gsm | 2.4 (PET/METPET) 2.7 (METPET/PE) | 1.6 (PET/METPET) 1.2 (METPET/PE) | 1.5 (PET/METPET) 1.3 (METPET/PE) | 1.6 (PET/METPET) 1.3 (METPET/PE) |
| NCO Tank Temp. | N.A. | 42° C. | 45° C. | 42° C. |
| OH Tank Temp. | N.A. | 38° C. | 38° C. | 38° C. |
| Hose Temp. | N.A. | 40° C. | 40° C. | 40° C. |
| Metering Roller (S1/S2) Temp. | N.A. | 45° C. (PET/METPET) 45° C. (METPET/PE) | 44° C. (PET/METPET) 45° C. (METPET/PE) | 45° C. (PET/METPET) 45° C. (METPET/PE) |
| Coating Roller (S3) Temp. | N.A. | 50° C. (PET/METPET) 45° C. (METPET/PE) | 48° C. (PET/METPET) 45° C. (METPET/PE) | 50° C. (PET/METPET) 45° C. (METPET/PE) |
| Nip Roller (S4) Temp. | N.A. | 55° C. (PET/METPET) 40° C. (METPET/PE) | 50° C. (PET/METPET) 45° C. (METPET/PE) | 55° C. (PET/METPET) 40° C. (METPET/PE) |

N.A. = not applicable

Flexible pouches are prepared with the flexible five-layer laminates from Table 4. Bond strength, seal strength, and solvent residue are evaluated with results shown in Table 5 below.

TABLE 5

Results for 2$^{nd}$ pass (Before Liquor Resistance Test)

| | ADCOTE ™ 548-81R/ Coreactant-F CS-1 | MOR-FREE ™ 899A/C-99 CS-2 | 77**/60** CS-3 | PACACEL ™ 968/C-108 IE-1 |
|---|---|---|---|---|
| Bond Strength (Before 60-day Liquor Resistance Test) (gm/15 mm) | PET/METPET bond Printed Area 201 (90% metal transfer) Unprinted Area 174 (PET tear) METPET/PE bond 280 (PET tear) | PET/METPET bond 166 (PET tear, 50% ink transfer) METPET/PE bond 438 (PET tear) | PET/METPET bond 130 (PET tear, 50% ink transfer) METPET/PE bond 406 (PET tear) | PET/METPET bond Printed Area 157 (80% ink transfer) Unprinted Area 163 (PET tear) METPET/PE bond 429 (PET tear) |
| Seal Strength (Kg/15 mm) 150° C., 1.0 sec, 2.5 bar pressure | 5.4 | 5.8 | 5.6 | 6.6 |
| Solvent Residue (mg/m$^2$) EA | 5.28 2.74 | 0.15 0.06 | 0.34 0.13 | 0.07 0.05 |
| MEK TOTAL | 8.02 | 0.21 | 0.47 | 0.12 |

EA = Ethyl Acetate
MEK = Methyl Ethyl Ketone

Flexible pouches are prepared with the flexible five-layer laminates from Table 4. An alcoholic beverage (whiskey or wine) is placed in the storage compartment of each flexible pouch and the pouches are completely sealed. After the 60-day liquor resistance test, bond strength and physical appearance of each pouch is evaluated with results shown in Table 6 below.

TABLE 6

Bond Strength Results (METPET/PE) and Physical appearance after Liquor Resistance Test for 5 Layer laminate pouch.

| | | ADCOTE ™ 548-81R/ Coreactant-F CS-1 | MOR-FREE ™ 899A/C-99 CS-2 | 77**/60** CS-3 | PACACEL ™ 968/C-108 IE-1 |
|---|---|---|---|---|---|
| Whiskey | Liquor in, Liquor Out | 218* Small pinholes Gold ink-smearing Metal Decal Delamination | 188* Small pinholes on printed area. No pinholes on unprinted area Gold ink-smearing | 140* Small pinholes on printed area. No pinholes on unprinted area Gold ink-smearing | 261* Small pinholes on printed area. No pinholes on unprinted area Gold ink-smearing |
| | Liquor in, Water Out | 32* Blisters Piping Delamination | 48* Blisters Piping Delamination | 24* Blisters Piping Delamination | No value* Pinholes on printed and unprinted area Gold ink no smearing |
| Wine | Liquor in, Liquor Out | 204* Metal Decal Delamination | 194* Small Pinholes Gold ink no smearing | 126* Small Pinholes Gold ink no smearing | 255* No Pinholes Gold ink no smearing |
| | Liquor in, Water Out | 112* Blisters Piping Delamination | 75* Blisters Piping Delamination | 8* Blisters Piping Delamination | 14* Blisters |
| Overall Observations Of Pouch | | Metal Decal & Delamination | Delamination observed | Delamination observed | No Metal Decal & No Delamination |

*Bond strength, gm/15 mm

Liquor Resistance test for 60 days.

Liquor in/Liquor Out:

A small pouch was made by filling liquor (whiskey or wine) and then sealed. A big pouch was made by filling with the same liquor and inserting the small pouch inside the big pouch and then sealing the big pouch. The small pouch is in contact with liquor from inside and outside; i.e., the Liquor in/Liquor out test. The inner pouch was observed for appearance in terms of Blisters/Piping/Tunneling/De-lamination for 60 days.

Liquor in/Water Out:

A small pouch was made by filling liquor (whiskey or wine) and then sealed. A big pouch was made by filling with water and inserting the small pouch inside the big pouch and then sealing the big pouch. The small pouch is in contact with liquor from inside and water from outside; i.e., the Liquor in/Water out test. The inner pouch was observed for appearance in terms of Blisters/Piping/Tunneling/De-lamination for 60 days.

Solvent residue. Solvent residue values are higher for laminates prepared with Adcote™ 548-81R/Coreactant-F (CS-1) as compared to other adhesives (PacAcel™ 968/C-108 (IE-1), 77/60 (CS-3) and Mor-Free™899A/C-99) (CS-2).

The solvent used during the printing process and also for lamination with solvent-based adhesive (CS-1: Adcote™ 548-81R/COREACTANT-F) results in a high amount of solvent residue in the laminate, when compared to the laminates made from the solvent-free adhesives CS-2, CS-3 and IE-1. In case of lamination with solvent-free adhesives (CS-2, CS-3 and IE-1), solvents are not used during lamination, although very minor traces of solvent may be captured from the surrounding processing equipment (such as printing process). The solvent residue value for IE-1 (PacAcel™ 968/C-108) is low compared to the solvent residue value for CS-1 (Adcote™ 548-81R/COREACTANT-F).

Bond Strength. Initial bond strength of laminates (before the 60-day liquor resistance test) prepared with PacAcel™ 968/C-108 (IE-1) is higher than that of Adcote™ 548-81R/Coreactant-F (CS-1). For IE-1 retention of bond strength after the 60-day liquor resistance test is excellent and meets a bond strength greater than 200 gm/15 mm. IE-1 is better than all other adhesives CS-1, CS-2, CS-3, especially for whiskey packaging which is the most common liquor packaged in flexible pouches. Bounded by no particular theory, the low molecular weight (Mw ~2000), the presence of adipic acid and NPG in the solvent-free polyurethane adhesive formulation of IE-1 provides the PacAcel™ 968/C-108 a high degree of crosslinking with low solvent residue (0.12 mg/m$^2$), enabling a bond strength of greater than 200 gm/15 mm after the 60-day liquor resistance test (whiskey), which is not the case with other solvent-free adhesives (CS-2 & CS-3).

Appearance. Laminates prepared with PacAcel™ 968/C-108 do not show any signs of Metal decal & De-lamination beyond 60 days.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A flexible pouch comprising:
opposing flexible laminates sealed along a common peripheral edge to form a storage compartment;
each flexible laminate having at least three layers consisting of
(A) a seal layer consisting of an ethylene/$C_4$-$C_8$ α-olefin copolymer, (B) an outermost layer consisting of polyethylene terephthalate,
(C) an adhesive layer between the seal layer and the outer layer, the adhesive layer consisting of a solvent-free crosslinked polyurethane adhesive composition consisting of
an isocyanate component that is a blend of
(i) an aromatic isocyanate prepolymer, and
(ii) an aliphatic isocyanate prepolymer, and
a polyol component; and
(D) an optional middle layer consisting of a metalized film;
an alcoholic beverage in the storage compartment;
the flexible pouch has
a solvent residue less than 1.0 mg/m$^2$; and
a bond strength greater than 200 gm/15 mm after a 60-day liquor resistance test.

2. The flexible pouch of claim 1 wherein the pouch is a blister-free pouch after the 60-day liquor resistance test.

3. The flexible pouch of claim 1 wherein each flexible laminate consists of (A) the seal layer, (B) the outermost layer, and (C) the adhesive layer between the seal layer and the outer layer; and the flexible pouch has
a solvent residue less than or equal to 0.05 mg/m$^2$; and
a bond strength greater than 200 gm/15 mm after the 60-day liquor resistance test.

4. The flexible pouch of claim 1 comprising (D) the middle layer disposed between the seal layer and the outermost layer.

5. The flexible pouch of claim 4 wherein the middle layer is a metallized polyethylene terephthalate.

6. The flexible pouch of claim 5 wherein the flexible pouch has a solvent residue less than 0.20 mg/m$^2$.

7. The flexible pouch of claim 6 wherein each flexible laminate consists of (A) the seal layer, (B) the outermost layer, (C) an adhesive layer on each side of the middle layer, and (D) the middle layer composed of metallized polyethylene terephthalate; and the flexible pouch has
a solvent residue less than 0.20 mg/m$^2$; and
a bond strength greater than 200 gm/15 mm after the 60-day liquor resistance test.

8. The flexible pouch of claim 7 wherein the flexible pouch is a pillow pouch or a stand-up pouch.

9. The flexible pouch of claim 7 wherein the flexible pouch is a stand-up pouch.

10. The flexible pouch of claim 1 wherein the solvent-free polyurethane adhesive composition comprises neopentyl glycol.

11. The flexible pouch of claim 1 wherein the polyol component is a polyester polyol based on adipic acid with diethylene glycol and neopentyl glycol.

12. The flexible pouch of claim 1 wherein the isocyanate component has a density from 1.18 g/cc to 1.24 g/cc and the polyol component has a density from 1.09 g/cc to 1.15 g/cc.

13. The flexible pouch of claim 12 wherein the isocyanate component has a melt viscosity from 2500 cps to 4500 cps and the polyol component has a melt viscosity from 1500 cps to 2900 cps.

14. The flexible pouch of claim 13 wherein the solvent-free crosslinked polyurethane adhesive composition has a pot life from 35 minutes to 45 minutes.

* * * * *